United States Patent

Schlueter, Jr. et al.

[11] Patent Number: 5,876,636
[45] Date of Patent: Mar. 2, 1999

[54] HALEOELASTOMER AND DOPED METAL OXIDE COMPOSITIONS

[75] Inventors: Edward L. Schlueter, Jr., Rochester; Joseph Mammino, Penfield; Gerald M. Fletcher, Pittsford; Donald S. Sypula, Penfield; James F. Smith, Ontario; Lucille M. Sharf, Pittsford; Robert M. Ferguson, Penfield, all of N.Y.

[73] Assignee: Xerox Corporation, Stamford, Conn.

[21] Appl. No.: 4,209

[22] Filed: Jan. 8, 1998

[51] Int. Cl.⁶ .................................................... H01B 1/20
[52] U.S. Cl. ........................ 252/520.1; 252/519.33; 524/910; 524/911
[58] Field of Search ................ 252/518.1, 520.1, 252/519.33; 524/910, 911

[56] References Cited

U.S. PATENT DOCUMENTS

| | | | |
|---|---|---|---|
| 4,426,435 | 1/1984 | Oka | 430/132 |
| 5,147,751 | 9/1992 | Kojima et al. | 430/125 |
| 5,249,525 | 10/1993 | Lewis et al. | 101/453 |
| 5,340,679 | 8/1994 | Badesha | 430/126 |
| 5,572,304 | 11/1996 | Seto et al. | 399/313 |
| 5,585,905 | 12/1996 | Mammino et al. | 355/272 |
| 5,635,327 | 6/1997 | Fukuda et al. | 430/128 |
| 5,753,317 | 5/1998 | Law | 427/487 |

*Primary Examiner*—Mark Kopec
*Assistant Examiner*—Derrick G. Hamlin
*Attorney, Agent, or Firm*—Annette L. Bade

[57] ABSTRACT

A composition having a) a haloelastomer with halogenated monomers, polyorganosiloxane monomers, or both halogenated and polyorganosiloxane monomers, and b) a doped metal oxide, preferably antimony doped tin oxide, dispersed or contained therein, wherein the composition can be formed into films or outer layers of components useful in xerographic processes.

19 Claims, 2 Drawing Sheets

HALEOELASTOMER AND DOPED METAL OXIDE COMPOSITIONS

Attention is directed to copending application Attorney Docket Number D/95609, U.S. patent application Ser. No. 08/004,554, filed Jan. 8, 1998, entitled, "Polyimide and Doped Metal Oxide Fuser Components," Attorney Docket Number D/95609Q2, U.S. patent application Ser. No. 08/004,421, filed Jan. 8, 1998, entitled, "Haloelastomer and Doped Metal Oxide Film Components," Attorney Docket Number D/95609Q3, U.S. patent application Ser. No. 08/004,385, filed Jan. 8, 1998, entitled, "Polyimide and Doped Metal Oxide Intermediate Transfer Components," and Attorney Docket Number D/95609Q4, U.S. patent application Ser. No. 08/004,492, filed Jan. 8, 1998, entitled, "Polyurethane and Doped Metal Oxide Film Components." The disclosures of these applications each of which are hereby incorporated by reference in their entirety.

BACKGROUND OF THE INVENTION

The present invention relates generally to an imaging apparatus and compositions useful as layers for film components thereof, for use in electrostatographic, including digital, apparatuses. The compositions herein are useful for many purposes including layers for fixing films, bias transfer films, intermediate transfer films, transfix films, and the like. More specifically, the present invention relates to compositions comprising a haloelastomer and a doped metal oxide conductive filler in order to impart a desired resistivity wherein, in embodiments, the resistivity is stable to changes in the environment, such as changes in relative humidity and temperature. In specific embodiments, the doped metal oxide conductive filler is an antimony doped tin oxide filler. The compositions of the present invention may be useful in films used in xerographic machines, especially color machines.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

In many of the components useful in the xerographic process, it is desirable to be able to tailor the resistivity of layers of components for proper and efficient workability. In addition, it is desirable that the resistivity of the components remain relatively constant and that the resistivity not be sensitive to changes in the environment, such as changes in temperature and/or relative humidity. Therefore, it is desirable that the resistivity of layers useful in xerographic components be controlled.

Attempts at controlling the conductivity of layers, especially outer layers, of components, have been accomplished by, for example, adding conductive fillers such as ionic additives to the surface layer of the components. However, to some extent, there are problems associated with the use of these additives. In particular, undissolved particles frequently bloom or migrate to the surface of a polymer and cause an imperfection in the polymer. This leads to a nonuniform resistivity, which in turn, leads to poor antistatic properties and poor mechanical strength for layers using the filled polymers. The ionic additives on surface layers may interfere with toner release and affect toner offset when the filled polymers are used as layers for intermediate transfer members, fuser members, bias transfer members, transfix members, and the like. The higher temperatures of the fusing process also increase the mobility of the ionic components and increase depletion rates. Furthermore, bubbles appear in the conductive polymer, some of which can only be seen with the aid of a microscope, others of which are large enough to be observed with the naked eye. These bubbles provide the same kind of difficulty as the undissolved particles in the polymer namely, poor or nonuniform electrical properties and poor mechanical properties.

In addition, the ionic additives themselves are sensitive to changes in temperature, humidity, operating time and applied field. These sensitivities often limit the resistivity range. For example, the resistivity usually decreases by up to two orders of magnitude or more as the humidity increases from 20% to 80% relative humidity. This effect limits the operational or process latitude.

Moreover, ion transfer can also occur in these systems. The transfer of ions will lead to contamination problems, which in turn, can reduce the life of the machine. Ion transfer also increases the resistivity of the polymer member after repetitive use. This can limit the process and operational latitude and eventually the ion-filled polymer component will be unusable.

Use of carbon black as a conductive filler has also been disclosed. Carbon black has been the chosen additive for imparting conductive properties in electrostatographic films. Carbon black is relatively inexpensive and very efficient in that a relatively small percentage can impart a high degree of conductivity. However, in practice with this material, it difficult and sometimes impossible to fabricate products with the desired level of conductivity. Further, films filled with carbon black have a tendency to contaminate their surroundings with black, conductive debris. In particular, the carbon black can cause undesirable black marks on the copied or printed substrates. Carbon black particles can also impart other specific adverse effects. Such carbon dispersions are difficult to prepare due to carbon agglomeration, and the resulting layers may deform due to random hard carbon agglomerate formation sites as well as non-uniform electrical properties. This can lead to an adverse change in the conformability of the layer.

Many doped metal oxides offer significant advantages in both color and transparency when compared to carbon black. They are, however, relatively expensive and usually require higher dosages to achieve comparable levels of conductivity. In addition, dispersion of metal oxides can lead to short comings in surface roughness and particle size.

U.S. Pat. No. 5,147,751 discloses that a polyurethane with antimony doped tin oxide filler may be used as the outer protective layer of a photoreceptor. The patent also discloses that the outer layer may be comprised of a fluoroplastic binder resin.

U.S. Pat. No. 4,426,435 discloses an electrophotographic light-sensitive member comprising a conductive support, a photoconductive layer and a protective outer layer, wherein the protective outer layer may be comprised of a binder of, for example, fluorocarbon or polyurethane, and a filler, such as, for example, antimony doped tin oxide.

U.S. Pat. No. 5,503,955 discloses the use of antimony doped tin oxide in polyurethane or polyimide as an adhesive in a photoreceptor.

U.S. Pat. No. 5,635,327 discloses a photoreceptor having a surface layer comprised of a dried and/or cured product under a reduced pressure of an inorganic or organic high molecular weight material and a conductive metal oxide dispersed therein. The high molecular weight resin is disclosed as, for example, fluororesin, polyurethane or polyimide, and the conductive filler is disclosed as, for example, antimony doped tin oxide.

U.S. Pat. No. 5,585,905 discloses an intermediate toner transfer member comprising a substrate and an outer layer comprised of a fluoropolymer polymerized from a plurality of monomers, at least one monomer being an olefin having only carbon atoms and hydrogen atoms, and at least one monomer being fluorinated. The outer layer may include conductive particles such as antimony doped tin oxide.

Therefore, a need remains for compositions useful as layers for xerographic members for use in electrostatographic machines, wherein the layer possesses the desired resistivity without the drawbacks of lack of transparency of the layer which may adversely affect its use in color products, especially color imaging systems. Further, a need remains for a compositions useful in conductive films having conductive fillers which impart the desired resistivity without compromising surface roughness. Moreover, a need exists for compositions useful as layers in which the resistivity thereof is uniform and is relatively unaffected by changes in environmental conditions such as changes in humidity, temperature, and the like.

SUMMARY OF THE INVENTION

The present invention provides, in embodiments, a composition comprising a) a haloelastomer consisting essentially of monomers selected from the group consisting of halogenated monomers, polyorganosiloxane monomers, and mixtures thereof; and b) a doped metal oxide filler.

In addition, the present invention provides, in embodiments, a composition comprising a) a haloelastomer consisting essentially of halogenated monomers, and b) a doped metal oxide, wherein said doped metal oxide is present in an amount of from about 20 to about 30 percent by weight of total solids, and wherein said composition has a surface resistivity of from about $10^6$ to about $10^{13}$ ohms/sq.

BRIEF DESCRIPTION OF THE DRAWINGS

The above embodiments of the present invention will become apparent as the following description proceeds upon reference to the drawings which include the following figures.

DETAILED DESCRIPTION OF THE INVENTION

The present invention is directed to compositions useful as layers for components, and in particular, film components including films, sheets, belts and the like. In one embodiment of the present invention, the composition comprises a haloelastomer and electrically conductive fillers. In another embodiment, the composition comprises a haloelastomer having electrically conductive fillers dispersed or contained therein. In a preferred embodiment, the fillers are doped metal oxide fillers, and in a particularly preferred embodiment, the fillers are antimony doped tin oxide fillers.

Figure 1:
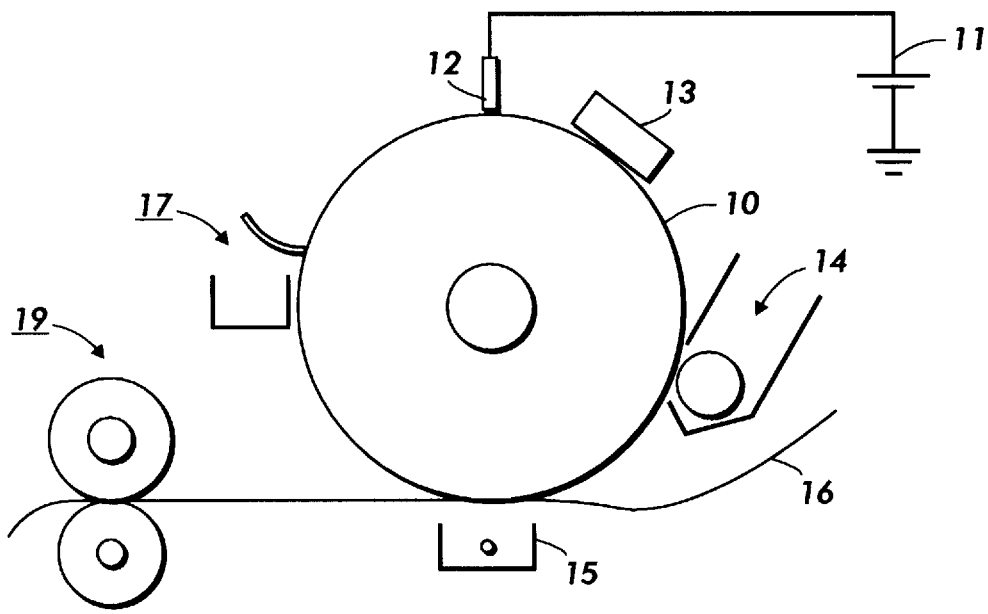
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet. The transfer process may optionally include heating sufficient to achieve partial or full melting of the toner particles prior to or in the transfer zones to, for example, create adhesive assist during the transfer steps or even to achieve partial or else complete image fixing to the copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing and pressure members, thereby forming a permanent image. If complete fusing is accomplished during the transfer step, a post fusing station may not be required. Photoreceptor 10, subsequent to transfer, advances to cleaning station 17, wherein any toner left on photoreceptor 10 is cleaned therefrom by use of a blade (as shown in FIG. 1), brush, or other cleaning.

The compositions herein may be useful as layers of xerographic components. The compositions comprise a haloelastomer and a filler, preferably a doped metal oxide filler. Preferred haloelastomers include haloelastomers comprising halogen monomers, halolastomers comprising polyorganosiloxanes, and haloelastomers comprising halogen monomers and polyorganosiloxane monomers. A particularly preferred haloelastomer comprises only halogenated monomers.

Examples of haloelastomers comprising halogen monomers include fluoroelastomers comprising copolymers and terpolymers of vinylidenefluoride, hexafluoropropylene and tetrafluoroethylene, which are known commercially under various designations as VITON A®, VITON E®, VITON E60C®, VITON E45®, VITON E430®, VITON B 910®, VITON GH®, VITON B50®, VITON E45®, and VITON GF®. The VITON® designation is a Trademark of E. I. DuPont de Nemours, Inc. Two preferred known fluoroelastomers are (1) a class of copolymers of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoroide, hexafluoropropylene, tetrafluoroethylene and a cure site monomer. VITON A®, and VITON B®, and other VITON® designations are trademarks of E. I. DuPont de Nemours and Company.

In another preferred embodiment, the fluoroelastomer is a tetrapolymer having a relatively low quantity of vinylidenefluoride. An example is VITON GF®, available from E. I. DuPont de Nemours, Inc. The VITON GF® has 35 mole percent of vinylidenefluoride, 34 mole percent of hexafluoropropylene and 29 mole percent of tetrafluoroethylene with 2 percent cure site monomer. The cure site monomer can be those available from DuPont such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomer.

Other preferred haloelastomers include haloelastomers comprising polyorganosiloxane monomers and haloelastomers comprising halogen monomers and polyorganosiloxane monomers, such as polymer composites including, for example, volume grafted elastomers, titamers, grafted titamers, ceramers, and grafted ceramers.

In one embodiment of the invention, the haloelastomer is a volume grafted elastomer. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator.

Volume graft, in embodiments, refers to a substantially uniform integral interpenetrating network of a hybrid composition, wherein both the structure and the composition of the fluoroelastomer and polyorganosiloxane are substantially uniform when taken through different slices of the layer. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane. Examples of specific volume graft elastomers are disclosed in U.S. Pat. Nos. 5,166,031; 5,281,506; 5,366,772; and 5,370,931, the disclosures of which are herein incorporated by reference in their entirety.

In embodiments, the polyorganosiloxane has the formula I:

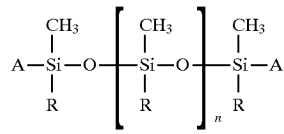

where R is an alkyl from about 1 to about 24 carbons, or an alkenyl of from about 2 to about 24 carbons, or a substituted or unsubstituted aryl of from about 4 to about 24 carbons; A is an aryl of from about 6 to about 24 carbons, a substituted or unsubstituted alkene of from about 2 to about 8 carbons, or a substituted or unsubstituted alkyne of from about 2 to about 8 carbons; and n is from about 2 to about 400, and preferably from about 10 to about 200 in embodiments.

In preferred embodiments, R is an alkyl, alkenyl or aryl, wherein the alkyl has from about 1 to about 24 carbons, preferably from about 1 to about 12 carbons; the alkenyl has from about 2 to about 24 carbons, preferably from about 2 to about 12 carbons; and the aryl has from about 4 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastorner. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

Ceramers are also preferred polymer composites useful as xerographic coatings. A ceramer generically refers to a hybrid material of organic and composite composition which typically has ceramic-like properties. As used herein, the term ceramer refers to, in embodiments, a composite polymer comprised of substantially uniform integral interpenetrating networks of a haloelastomer and silicon oxide (tetraethoxy orthosilicate). The term grafted ceramer refers to, in embodiments, a composite polymer comprised of substantially uniform integral interpenetrating networks of a polyorganosiloxane grafted haloelastomer and silicon oxide network. In the grafted ceramer, the haloelastomer is the first monomer segment, the polyorganosiloxane is the third monomer segment and the second monomer segment is tetraethoxy orthosilicate, the intermediate to a silicon oxide network. Both the structure and the composition of the polyorganosiloxane grafted haloelastomer and silicon oxide networks are substantially uniform when viewed through different slices of the layer. The phrase interpenetrating network refers to the intertwining of the haloelastomer and silicon oxide network polymer strands for the ceramer, and to the intertwining of the polyorganosiloxane grafted haloelastomer and silicon oxide polymer network strands for the grafted ceramer. The phrase haloelastomer may be any suitable halogen containing elastomer such as a chloroelastomer, a bromoelastomer, or the like, mixtures thereof, and preferably is a fluoroelastomer. Examples of suitable fluoroelastomers are set forth above. Examples of suitable polyorganosiloxanes are referred to above. The phrases "silicon oxide," "silicon oxide network," "network of silicon oxide" and the like refer to alternating, covalently bound atoms of metal and oxygen, wherein alternating atoms of silicon and oxygen may exist in a linear, branched, and/or lattice pattern. The atoms of silicon and oxygen exist in a network and not as discrete particles. Preferred ceramers and grafted ceramers are described in U.S. Pat. No. 5,337,129, the disclosure of which is hereby incorporated by reference in its entirety.

In a preferred embodiment of the invention, the ceramer has the following formula II:

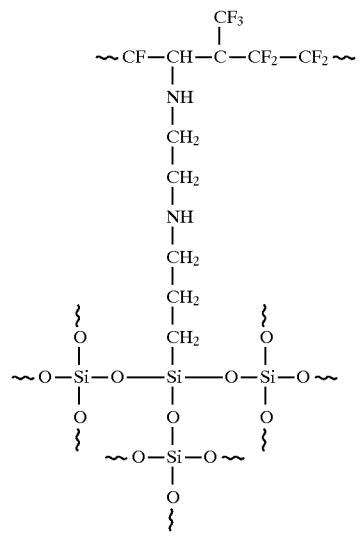

In the above formula, the symbol "~" represents a continuation of the polymer network.

In a preferred embodiment of the invention, a grafted ceramer has the following formula III:

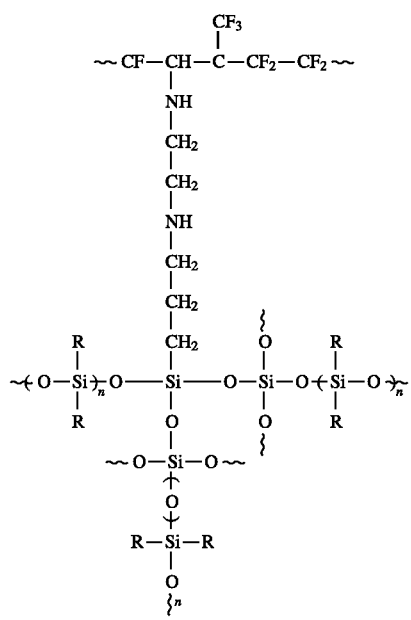

In the above formula, R is the R group of the polyorganosiloxane described above and may be a substituent as defined herein for the R group of the polyorganosiloxane; n is a number as herein defined for the n of the polyorganosiloxane above; and the symbol "~" represents a continuation of the polymer network.

Titamers are also preferred polymer composites suitable for the xerographic coating herein. Titamers are discussed in U.S. Pat. Nos. 5,500,298; 5,500,299; and 5,486,987, the disclosures each of which are hereby incorporated by reference in their entireties. As used herein, the phrase titamer refers to a composite material comprised of substantially uniform integral interpenetrating networks of haloelastomer and titanium oxide network, wherein both the structure and the composition of the haloelastomer and titanium oxide network, are substantially uniform when viewed through different slices of the coating layer. The phrase grafted titamer refers to a substantially uniform integral interpenetrating networks of a polyorganosiloxane grafted haloelastomer and titanium oxide network, wherein the haloelastomer is the first monomer segment, the polyorganosiloxane is the third grafted monomer segment and titanium isobutoxide, the intermediate to titanium oxide network, is the second monomer segment. Both the structure and the composition of the polyorganosiloxane grafted haloelastomer and titanium oxide network are substantially uniform when viewed through different slices of the xerographic coating layer. The phrase interpenetrating network refers to the intertwining of the haloelastomer and titanium oxide network polymer strands for the titamer, and to the intertwining of the polyorganosiloxane grafted haloelastomer and titanium oxide network polymer strands for the grafted titamer. The phrase haloelastomer may be any suitable halogen containing elastomer such as a chloroelastomer, a bromoelastomer, or the like, mixtures thereof, and preferably is a fluoroelastomer as described above. The phrase "titanium oxide," network of titanium oxide," or "titanium oxide network" or similar phrases refers to alternating, covalently bound atoms of titanium and oxygen, wherein the alternating atoms of titanium and oxygen may exist in a linear, branched and/or lattice pattern. The atom of titanium and oxygen exist in a network and not as discrete particles.

Examples of titamers include those having the following formula IV:

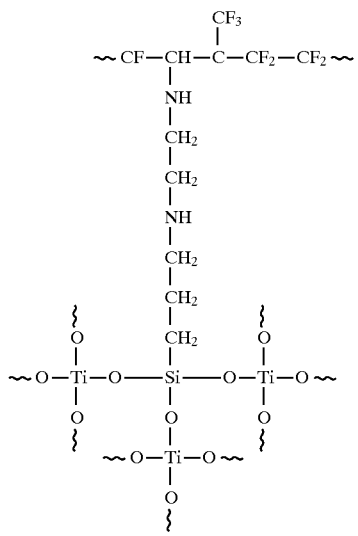

In the above formula, the symbol "~" represents the continuation of the polymeric network.

Examples of grafted titamers include those having the following formula V:

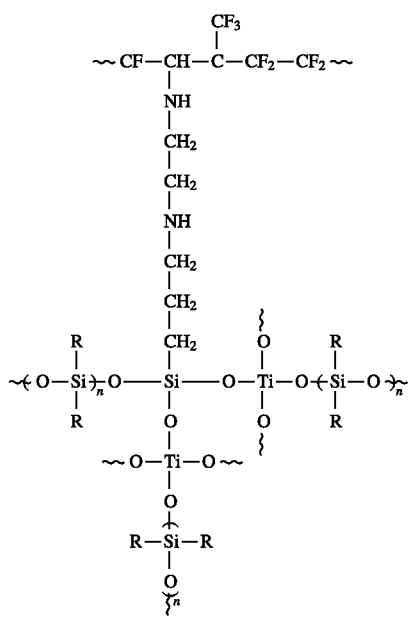

In the above formula, R is the R group of the polyorganosiloxane described above and may be a substituent as defined herein for the R group of the polyorganosiloxane; n is a number as herein defined for the n of the polyorganosiloxane above; and the symbol "~" represents a continuation of the polymer network.

Other preferred haloelastomers include fluoroelastomers such as fluorosilicones, fluorourethanes, fluoroacrylate such as LUMIFLON® available from ICI Americas, Inc., Wilmington, Del., and other fluoroelastomers such as polyvinyl fluoride such as TEDLAR®, polyvinylidiene fluoride such as KYNAR®, and the like.

In addition, preferred haloelastomers include those comprising polyorganosiloxane copolymers such as polyamide polyorganosiloxane copolymers, polyimide polyorganosiloxane copolymers, polyester polyorganosiloxane copolymers, polysulfone polyorganosiloxane copolymers, polystyrene polyorganosiloxane copolymers, polypropylene polyorganosiloxane copolymers, and polyester polyorganosiloxane copolymers.

The haloelastomer is present in the composition in an amount of from about 95 to about 35 percent, preferably from about 90 to about 50 percent, and particularly preferred is from about 80 to about 70 percent by weight of total solids. Total solids as used herein refers to the total amount by weight of haloelastomer, doped metal oxide filler, and any additional additives, fillers or like solid materials.

The compositions comprise electrically conductive particles dispersed therein. These electrical conductive particles decrease the material resistivity into the desired resistivity range. The desired surface resistivity is from about $10^6$ to about $10^{13}$, preferably from about $10^8$ to about $10^{12}$, and more preferably from about $10^{10}$ to about $10^{12}$ ohms/sq. The preferred volume resistivity range is from about $10^5$ to about $10^{14}$, preferably from about $10^8$ to about $10^{14}$, and particularly preferred is from about $10^{12}$ to about $10^{14}$ ohm-cm. The desired resistivity can be provided by varying the concentration of the conductive filler. It is important to have the resistivity within this desired range. When the compositions are formed into film components, the components may exhibit undesirable effects if the resistivity is not within the required range. Other problems include resistivity that is susceptible to changes in temperature, relative humidity, and the like. The combination of haloelastomer and doped metal oxide filler, in embodiments, allows for tailoring of a desired resistivity, and further, allows for a stable resistivity virtually unaffected by changes in relative humidity and temperature.

Examples of conductive fillers include doped metal oxides such as aluminum doped zinc oxide (ZnO), antimony doped titanium dioxide ($TiO_3$), metal oxides such as barium titanate ($BaTiO_3$), titanium oxide, and the like, including organic complexes such as polypyrrole, polyanaline, and the like. In a preferred embodiment of the invention, the electrically conductive filler is antimony doped tin oxide. Suitable antimony doped tin oxides include those antimony doped tin oxides coated on an inert core particle (e.g., ZELEC® ECP-S, M and T, available from DuPont Chemicals Jackson Laboratories, Deepwater, N.J.) and those antimony doped tin oxides without a core particle (e.g., ZELEC® ECP-3005-XC and ZELEC® ECP-3010-XC). The core particle may be mica, $TiO_2$ or acicular particles having a hollow or a solid core.

In a preferred embodiment, the antimony doped tin oxides are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the outer particles are fine enough in size to provide adequate transparency. The silica may either be a hollow shell or layered on the surface of an inert core, forming a solid structure.

Preferred forms of antimony doped tin oxide are commercially available under the tradename ZELEC® ECP (electroconductive powders) from DuPont. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC ECP-T), and a plate shaped mica core product (ZELEC® ECP-M). The following Tables demonstrate the product properties of ZELEC® ECP. This information was taken from a DuPont Chemicals Jackson Laboratory product brochure, dated September, 1992 and entitled, "The Application of Zelec ECP in Static Dissipative Systems."

TABLE 1

Product Physical Properties (S, T & M)

| Property | Core | Shape | Mean Part. Size |
|---|---|---|---|
| ECP-S | Hollow | Acicular | 3 microns |
| ECP-T | Solid | Equiaxial | 1 micron |
| ECP-M | Solid | Platelike | 10 microns |

TABLE 2

Product Chemical Properties (S, T & M)

| Property | ECP-S | ECP-T | ECP-M |
| --- | --- | --- | --- |
| Bulk Density | 0.4 gm/cc | 1.0 gm/cc | 0.6 gm/cc |
| Specific gravity | 3.9 gm/cc | 4.9 gm/cc | 3.9 gm/cc |
| Surface area | 50 m$^2$/gm | 20 m$^2$/gm | 30 m$^2$/gm |
| Mean part. size | 3 microns | 1 micron | 10 micron |
| Dry powder resist | 2–30 ohm-cm | 2–30 ohm-cm | 20–300 ohm-cm |
| Core | Hollow | TiO$_2$ | Mica |

TABLE 3

Product Properties (XC)

| Property | 3005-XC | 3010-XC |
| --- | --- | --- |
| Antimony % | 6.5 | 10 |
| Bulk powder resist. | .5 to 3 ohm-cm | .5 to 3 ohm-cm |
| Specific gravity | 6.5 to 7.5 gm/cc | 6.5 to 7.5 gm/cc |
| Surface area | 15 to 30 m$^2$/gm | 60 to 80 m$^2$/gm |
| Particle size (D50) | .7 microns | 2 microns |

The preferred particle size of the doped metal oxide is from about 0.5 to about 15 microns, and preferably from about 1 to about 10 microns.

In a particularly preferred embodiment of the invention, antimony doped tin oxide is added to the haloelastomer in an amount of about 5 to about 65 percent by weight of total solids, preferably from about 10 to about 50 percent by weight of total solids, and particularly preferred of from about 20 to about 30 percent by weight of total solids. Total solids is defined as the amount of haloelastomer, filler(s), any additives, and any other solid material additives of fillers.

Additives may be present in the composition. The type of additive will depend, in part, on what type of xerographic component the compositions are used in. Additives most likely to be used in xerographic component layers include cross linkers, silanes, titanates, zirconates, colorants, extenders, and the like. In addition, additional fillers may be dispersed in the haloelastomer. Examples of suitable fillers include carbon black, graphite, boron nitride, and metal oxides such as iron oxide, magnesium oxide, aluminum oxide, copper oxide, tin oxide, titanium oxide, zinc oxide, chrome oxide, nickel oxide, and the like, and mixtures thereof. The additional filler may be present in an amount of from about 1 to about 40 and preferably from about 4 to about 20 parts by weight of total solids.

Figure 2:
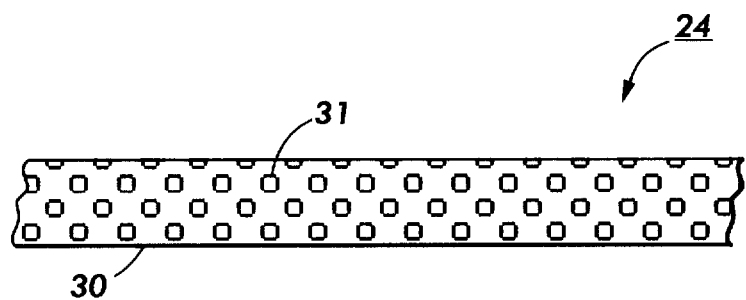
FIG. 2 is a sectional view of an embodiment of the present invention, wherein the composition is formed into a film.

FIG. 2 depicts an embodiment of the invention, wherein the composition is formed into a film layer 24. Film layer 24 comprises a haloelastomer substrate 30 with antimony doped tin oxide fillers 31 dispersed therein.

The compositions of the present invention can be formed into various xerographic component layers, and in preferred embodiments, can be formed into film components of any suitable configuration. Examples of suitable configurations include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, and the like. It is preferred that the substrate comprising the composition be an endless seamed flexible belt or seamed flexible belt, which may or may not include puzzle cut seams. Examples of such belts are described in U.S. Pat. Nos. 5,487,707; 5,514,436; and U.S. patent application Ser. No. 08/297,203 filed Aug. 29, 1994, the disclosures each of which are incorporated herein by reference in their entirety. A method for manufacturing reinforced seamless belts is set forth in U.S. Pat. No. 5,409,557, the disclosure of which is hereby incorporated by reference in its entirety.

The compositions herein may be formed into films, preferably in the form of a belt, has a width, for example, of from about 150 to about 2,000 mm, preferably from about 250 to about 1,400 mm, and particularly preferred is from about 300 to about 500 mm. The circumference of the belt is preferably from about 75 to about 2,500 mm, more preferably from about 125 to about 2,100 mm, and particularly preferred from about 155 to about 550 mm.

Compositions comprising a haloelastomer and a doped metal oxide, in embodiments, allow for layers to be formed wherein the resistivity of the layers can be tailored to a desired resistivity which is relatively unaffected by changes in environmental conditions such as, for example, temperature and relative humidity. The compositions further provide for, in embodiments, layers which allow for tailoring of a desired resistivity without the drawbacks of lack of transparency and without compromising surface roughness.

Specific embodiments of the invention will now be described in detail. These examples are intended to be illustrative, and the invention is not limited to the materials, conditions, or process parameters set forth in these embodiments. All parts are percentages by weight of total solids as defined above unless otherwise indicated.

EXAMPLES

Example 1

Fluoroelastomer filled with antimony doped tin oxide

An amount of 100 parts by weight fluoroelastomer (VITON B50®) was mixed with 512 parts by weight methyl ethyl ketone (MEK). Fillers were then added to the above fluoroelastomer solution in an 8 ounce glass jar as follows: 1 part by weight Ca(OH)$_2$, 2 parts by weight MgO, and various amounts of antimony doped tin oxide (20, 25, 30 and 40 parts by weight, respectively, antimony doped tin oxide sold under the tradename ZELEC® EPC 3005-XC available from DuPont Chemicals Jackson Laboratories, Deepwater, N.J.). Stainless steel shots (⅛ inches in diameter) were added in an amount of 150 grams to the above mixture of fluoroelastomer in solution with added fillers. The resulting compound was mixed on a paint shaker for 25 minutes and then filtered through a regular screen paint filter. Coatings were made with the four different levels of antimony doped tin oxide fillers using vacuum platen and manual draw down techniques. The coatings were then air dried for about 17 hours and then post cured, using a step heat cure, for approximately 24 hours.

Figure 3:
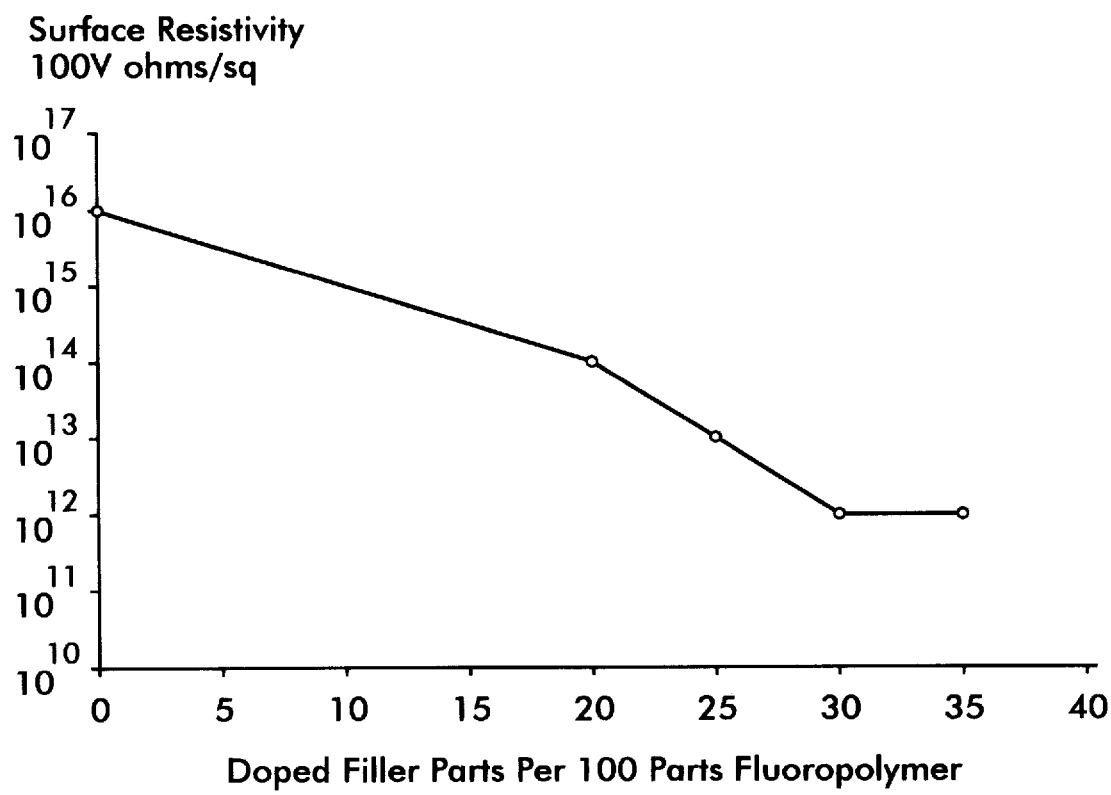
FIG. 3 is a graph of surface resistivity (100V ohm/sq 10E) versus amount of antimony doped tin oxide (parts per 100 parts fluoropolymer).

The coatings were then measured for resistivity. The coatings progressively became more conductive as the amount of antimony doped tin oxide filler increased. Specifically, the resistivity decreased from about 10$^{14}$ ohm-cm to about 10$^{12}$ ohm-cm. This is shown in FIG. 3 attached herewith which is a graph showing surface resistivity (100V ohm/sq 10E) versus amount of antimony doped tin oxide (parts per 100 parts fluoropolymer).

In addition, it was determined that the electronic conduction and resistivity was less effected by changes in percent relative humidity and temperature than ionic conduction. Therefore it is anticipated that the above material will be stable to environmental conditions.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A composition comprising a haloelestomer selected from the group consisting of a) copolymers of vinylidenefluoride, hexafluoropropylene, and tetrafluoroethylene, b) terpolymers of vinylidenefluoride, hexafluoropropylene and tetrafluoroethylene, and c) tetrapolymers of vinylidenefluoride, hexafluoropropylene, tetrafluoroetheylene, and a cure site monomer; and a doped metal oxide filler.

2. The composition claim 1, wherein said doped metal oxide is an antimony doped tin oxide filler.

3. The composition of claim 1, wherein said composition has a volume resistivity of from about $10^5$ to about $10^{14}$ ohm-cm.

4. The composition of claim 1, wherein said composition has a surface resistivity of from about $10^6$ to about $10^{13}$ ohm/sq.

5. The composition of claim 1, wherein said haloelastomer consists essentially of 35 mole percent of vinylidenefluoride, 34 mole percent of hexafluoropropylene, 29 mole percent of tetrafluoroethylene, and 2 percent cure site monomer.

6. The composition of claim 1, wherein said haloelastomer consists essentially of polyorganosiloxane monomers and halogenated monomers.

7. The composition of claim 6, wherein said haloelastomer is selected from the group consisting of volume grafted fluoroelastomers, ceramers, grafted ceramers, titamers and grafted titamers.

8. The composition of claim 6, wherein said haloelastomer comprises an additional monomer capable of reacting with said polyorganosiloxane monomer to form a polyorganosiloxane copolymer.

9. The composition of claim 8, wherein said polyorganosiloxane copolymer is selected from the group consisting of polyamide polyorganosiloxane copolymers, polyimide polyorganosiloxane copolymers, polyester polyorganosiloxane copolymers, polysulfone polyorganosiloxane copolymers, polystyrene polyorganosiloxane copolymers, polypropylene polyorganosiloxane copolymers, and polyester polyorganosiloxane copolymers.

10. The composition of claim 1, wherein said doped metal oxide filler is present in an amount of from about 5 to about 65 percent by weight of total solids.

11. The composition of claim 10, wherein said doped metal oxide filler is present in an amount of from about 20 to about 30 percent by weight of total solids.

12. The composition of claim 1, wherein said haloelastomer is present in an amount of from about 95 to about 35 percent by weight of total solids.

13. The composition of claim 11, wherein said haloelastomer is present in an amount of from about 80 to about 70 percent by weight of total solids.

14. The composition of claim 1, further comprising a conductive filler selected from the group consisting of carbon black, graphite, boron nitride, iron oxide, copper oxide, magnesium oxide, aluminum oxide, tin oxide, titanium oxide, zinc oxide, chrome oxide, nickel oxide, and mixtures thereof.

15. The composition of claim 2, wherein said antimony doped tin oxide comprises an inert core particle.

16. The composition of claim 15, wherein said core particle is selected from the group consisting of mica, tin oxide, and an acicular particle.

17. The composition of claim 16, wherein said acicular particle is hollow or solid.

18. The composition of claim 1, wherein said doped metal oxide has a particle size of from about 1 to about 10 microns.

19. A composition comprising a haloelastomer selected from the group consisting of a) copolymers of vinylidenefluoride, hexafluoropropylene, and tetrafluoroethylene, b) terpolymers of vinylidenefluoride, hexafluoropropylene and tetrafluoroethylene, and c) tetrapolymers of vinylidenefluoride, hexafluoropropylene, tetrafluoroethylene, and a cure site monomer; and a doped metal oxide, wherein said doped metal oxide is present in an amount of from about 20 to about 30 percent by weight of total solids, and wherein said composition has a surface resistivity of from about $10^6$ to about $10^{13}$ ohms/sq.

* * * * *